United States Patent [19]
Collet

[11] 3,786,647
[45] Jan. 22, 1974

[54] CENTRIFUGAL COMPRESSOR MELTER

[75] Inventor: Peter Jacobus Collet, Voorschoten, Netherlands

[73] Assignee: Nederlandse Organisatie Voor Toegepast Natuurwetenschapelijk Onderzoek Ten Behoeve Van Niverheid, Handel En Verkeer, The Hague, Netherlands

[22] Filed: Aug. 7, 1972

[21] Appl. No.: 278,392

[30] Foreign Application Priority Data
Aug. 23, 1971 Netherlands............................ 11595

[52] U.S. Cl......................... 62/123, 417/67, 417/68
[51] Int. Cl............................................. B01d 9/04
[58] Field of Search............. 62/58, 123; 417/67, 68

[56] References Cited
UNITED STATES PATENTS
3,612,723 11/1971 Staveren................................ 417/67
3,049,889 8/1962 Carfagno............................... 62/123

*Primary Examiner*—Meyer Perlin
*Assistant Examiner*—Ronald C. Capossela
*Attorney, Agent, or Firm*—Watson, Cole, Grindle & Watson

[57] ABSTRACT

In a device for the preparation of drinking-water out of brackish-water or salt-water, whereby the water is brought into contact with a cooling medium and the ice crystals are melted, the compressor and the melter-condenser vessel are combined into one unit, comprising a centrifugal fluid vanes compressor, the compressor chamber of which also forms the melting chamber and the fluid vanes are formed from a mixture of ice particles and a fluid which occurs in the process and which is fed to the jets.

2 Claims, 2 Drawing Figures

PATENTED JAN 22 1974  3,786,647

CENTRIFUGAL COMPRESSOR MELTER

BACKGROUND OF THE INVENTION

The invention relates to a device for the preparation of drainking-water out of brackish-water or salt-water that chiefly comprises a pre-cooler, an evaporator-cystallizer, an ice-brine separating-vessel, an auxiliary cooler, a compressor and a melter-condenser vessel.

Such a device is known in the art. The salt water is purified by forming the water, by means of direct contact with a volatile cooling agent, such as butane, Freon C-318, into ice that is relatively free from dissolved salts. The ice present in divided condition in the salt water is separated from it and melted so as to obtain drinking-water. The heat required for melting is obtained by bringing the ice into direct contact with the vapour that is produced upon freezing the water by means of evaporation of the cooling agent. By giving off the heat required for melting the vapour condenses again and the cooling agent is again available for re-use in the freezing operation.

Because the temperature for freezing the water is lower than that for melting the ice, the vapour pressure of the cooling agent in the freezing chamber is lower than that in the melting chamber, and it is necessary to raise in pressure, with the aid of a compressor, the cooling agent vapour coming from the freezing chamber before it enters into the melting chamber.

The melter-condenser vessel is mostly of the well-known "drained bed" type. The ice crystals are spread out on a grid and brought into direct contact with the compressed cooling gas, melting and condensing products draining via the grid under influence of gravity after the exchange of heat. The average diameter of the ice crystals is relatively small, typically 0.3 - 1.0 mm, so that per volume unity of solid substance the surface available for heat exchange is great. The high melting velocity to be expected because of this availability is not realized, however, by the conventional melters.

The causes of this above failure are the flow resistance of the bed, causing supply of cooling agent vapour and discharge of melting and condensing products to be restricted; coagulation of ice particles into agglomerates that retain liquid in the pores, accumulation at the heat-exchanging surfaces of non-condensable gases present in the cooling agent vapour.

The reduced heat-transfer mostly results in an enlargement of the melting-chamber, which involves a considerable increase in processing-costs and also an increase in the energy related to the melting operation.

It is the object of the invention to provide an improved melter-condenser in which the heat transfer between ice crystals to be melted and the compressed cooling agent vapours is improved.

It is another object to provide a centrifugal melter compressor in which the brine of water and ice crystals is brought into close contact with the cooling agent vapours.

THE INVENTION

Surprisingly it was found that melting the ice particles can be effected in the compression space of a fluid vanes compressor that is known in the art, the ice particles being suspended in the compressed cooling agent vapour at the end of the compression process. The above described adverse effects upon the heat-transfer now are almost completely absent.

In this process, compression of cooling agent vapour is effected by means of fluid vanes that then are formed from a mixture of ice particles and a fluid occurring in the process.

Moreover, it is an advantage that the compressor and the melter-condenser vessel according to the invention are combined into one unit which yields an important saving in installation costs.

The invention is characterized in that the compressor and the melter-condenser vessel are combined into one unit, which is formed by a centrifugal vanes compressor known per se, the compression chamber of which as well forms the melting chamber and in that the fluid vanes are formed from a mixture of ice particles and a fluid occurring in the process which is fed to the jets.

Application of a fluid vanes compressor has the advantage over the conventional contrifugal compressor that with a rotor of the same diameter a greater quantity by weight of gas per unit of time is compressed. By controlling the flow of the vanes-liquid, at constant circumferential speed, the power transferred per unit of gas can be adapted to varrying operating conditions. This is in particular of importance when driving is effected at constant circumferential speed, for instance by means of electromotors.

Furthermore, it is an advantage that by the highly improved heat-transfer the melting space required is small and the mechanical energy required for the melting operation is reduced.

The conventional centrifugal compressor has the drawback that in the freezing operation because of agitation of the fluid drops of salt water arrive at the vapour chamber and are sucked by the compressor. Then evaporation within the compressor yields deposition of salt, which deposition is adverse to the compression efficiency and the balancing of the rotor. Application of a fluid vanes compressor has the advantage that because of the relatively smaller rotor and the washing effect of the fluid that forms the vanes the contamination is restricted to a minimum.

Tee improved device for the preparation of drinking-water can also be applied in a process for purification of sea-water by formation of hydrates by means of direct contact with a volatile, hydrate-forming fluid, such as propane, freon 12. This process is very similar to the purification of sea-water by means of formation of ice crystals. The advantage is that hydrates are formed at a higher temperature than ice, which has a favourable influence on the energy consumption of the process.

Finally, the compressor-melter according to the invention can be applied, not only in a processing-installation for the purification of brackish-water or salt-water, but in every processing-installation involving such operations as the compression of a gas or vapour and the melting of a solid substance in divided condition by means of direct-contact heat exchange with the compressed medium.

DESCRIPTION OF DRAWING

The invention will be further elucidated below with reference to the drawings, in which by way of example an embodiment is schematically shown.

In it shows.

Figure 1:
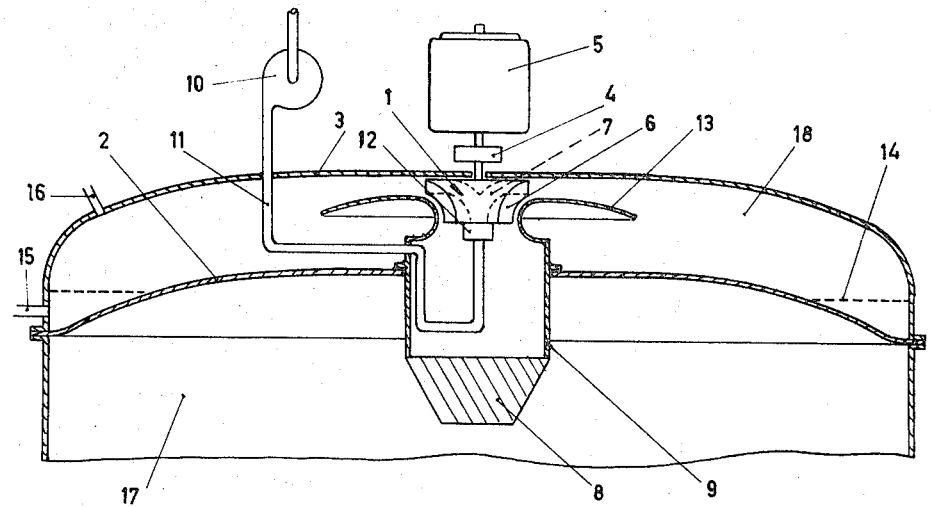
FIG. 1 a cross-section through a centrifugal fluid vanes compressor-melter.

In the compressor-melter shown in FIG. 1 a rotor 1 of a centrifugal fluid vanes compressor is mounted in the centre of a compression-melting chamber, which is bounded by an upper wall 2 of an evaporator-crystallizer, and a wall 3.

Rotor 1 is driven by an electromotor 5 via a coupling 4. Rotor 1 is provided with blades 6 for the guidance of cooling agent vapour and with jets 7 for the guidance of a vanes-medium consisting of a mixture of ice particles and drinking-water.

The cooling agent vapour is sucked from evaporator-crystallizer 17 via a water separator 8 and supply duct 9.

The vanes-medium is fed axially to rotor 1 by means of a pump 10, a supply duct 11 and a rotating seal 12. Transfer between vanes-medium and cooling agent of the mechanical energy required for the compression is effected in a diffusor chamber that is bounded by a diffusor plate 13 and wall 3. Melting chamber 18 is provided with a grid 14 for collecting incompletely molten ice particles, a duct 15 for the discharge of purified water together with cooling agent fluid and a duct 16 for discharge to the auxiliary cooling system of the cooling agent vapour that has not yet been condensed.

Figure 2:
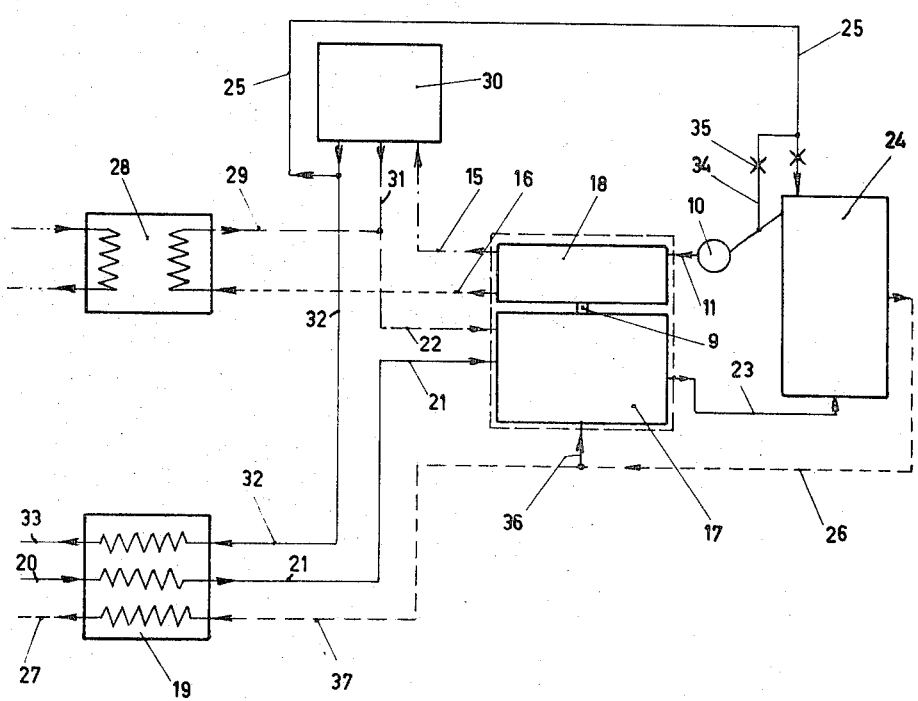
FIG. 2 a processing-scheme for the preparation of drinking-water out of sea-water with the compressor-melter incorporated in it.

In FIG. 2 a processing-scheme for the preparation of drinking-water is shown, in which the centrifugal fluid vanes compressor according to the invention is incorporated.

The purification process proceeds as follows:

Sea-water is supplied out of a duct 20 towards and pre-cooled in a pre-cooler 19 by means of heat exchange with the purified water that leaves the process on the one hand and with brine on the other hand. The cooled sea-water is, via duct 21 in a evaporator-crystallizer 17, brought into direct contact with a liquid cooling agent fed via duct 22, the cooling agent evaporating by heat exchange and the ice freezing out of the sea-water. The cooling agent vapour is sucked out of evaporator-crystallizer 17 by the rotor of centrifugal fluid vanes compressor 18 via duct 9. Via duct 23 the mixture of ice and brine is led out of evaporator-crystallizer 17 to a washing tower 24, in which by means of washing with sea-water fed in via 25 the ice is separated from the adhering brine, which is partially led back to evaporator-crystallizer 17 via ducts 26, 36, and is partially led to cooler 19 via ducts 26, 37 and is discharged at 27. The ice separated is then together with a part of the purified drinking-water led to the rotor section of fluid vanes compressor melter 18 by pump 10 via duct 11, so that vanes are formed out of a mixture of ice particles in water. These vanes compress the cooling agent gas sucked out of evaporator-crystallizer 17 via duct 9. By means of the direct contact of the ice particles suspended in the water jets with the compressed gas, the ice melts and the cooling agent condenses for a great part. The cooling agent vapour that still remains is led back to an auxiliary cooling system 28 via duct 16 and after condensation via ducts 22, 29 fed to evaporator-crystallizer 17 together with the cooling agent fluid led to it.

The purified water together with the cooling agent fluid is via duct 15 led out of compressor-melter 18 to decanting-device 30. The cooling agent fluid separated there is led again to evaporator-crystallizer 17 via ducts 31, 22 and the purified water is discharged for use at 33 via duct 32 and pre-cooler 19 and partially used for washing water and vanes water via duct 25.

With the aid of auxiliary cooling system 28 the heat added to the process is removed. This is effected for instance by compressing and condensing of a part of the cooling agent vapour produced upon freezing, condensation heat being given off to the environment.

In the example described above purified water is applied as fluid for the formation of the fluid vanes in the compressor melter, which is of advantage for the homogeneity of the fluid vanes.

It is also possible, however, to use the cooling agent for this application which may be advantageous for a still better melting action.

For this purpose the scheme shown needs only little alteration for this. Tube 34 with adjustable valve 35, then will be connected to tube 31 and 22 instead of to tube 25.

I claim:

1. A device for the preparation of drinking-water out of brackish-water or salt-water comprising: a pre-cooler, an evaporator-crystallizer operatively interconnected with said pre-cooler via a first duct, an ice-brine separating vessel operatively interconnected with said evaporator-crystallizer via a second duct, a compressor and a melter-condenser vessel operatively interconnected with said evaporator-crystallizer via a third duct, and an auxiliary cooler operatively interconnected with said compressor and melter-condenser via a fourth duct, said compressor and melter-condenser being combined into a single unit formed by means of a fluid vanes compressor, the compression chamber of said fluid vanes compressor defining a melting chamber, and the fluid vanes of said fluid vanes compressor being formed from a mixture of ice particles and a fluid guided by the jets of the fluid vanes compressor rotor.

2. A device according to claim 1, characterized in that said compressor-melter is mounted at an upper side of said evaporator-crystallizer.

* * * * *